(12) United States Patent  
Ataka (10) Patent No.: US 11,558,515 B2  
(45) Date of Patent: Jan. 17, 2023

(54) IMAGE FORMING APPARATUS (71) Applicant: SHARP KABUSHIKI KAISHA, Sakai (JP)

(72) Inventor: Hiroyuki Ataka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/489,010

(22) Filed: Sep. 29, 2021

(65) Prior Publication Data

US 2022/0109766 A1  Apr. 7, 2022

(30) Foreign Application Priority Data

Oct. 5, 2020 (JP) .............................. JP2020-168466

(51) Int. Cl.
*H04N 1/00* (2006.01)
(52) U.S. Cl.
CPC . H04N 1/00482 (2013.01); *H04N 2201/0094* (2013.01)
(58) Field of Classification Search
CPC ................. H04N 1/00482; H04N 2201/0094
USPC ...................................................... 358/1.13
See application file for complete search history.

(56) References Cited

U.S. PATENT DOCUMENTS

| 2007/0263242 | A1* | 11/2007 | Takahashi | .......... | H04N 1/00413 |
| | | | | | 358/1.14 |
| 2012/0081742 | A1* | 4/2012 | Yamada | ................ | G06F 3/1285 |
| | | | | | 358/1.15 |
| 2013/0215437 | A1* | 8/2013 | Kojima | .................. | G06K 15/10 |
| | | | | | 358/1.5 |

FOREIGN PATENT DOCUMENTS

| JP | 2001-013741 A | 1/2001 |
| JP | 2004326040 A | 11/2004 |
| JP | 2005035101 A | 2/2005 |

\* cited by examiner

*Primary Examiner* — Neil R McLean
(74) *Attorney, Agent, or Firm* — ScienBiziP, P.C.

(57) ABSTRACT

An image forming apparatus includes: a paper feed tray capable of storing paper of predetermined regular sizes and a custom size; a paper size setter which receives a setting of a paper size; a display; a communicator; an image former; and a controller. When the paper size setter receives a setting of paper of the custom size, the controller determines whether a regular size substantially the same as the custom size is found. When the regular size being substantially the same is found, the display displays a setting screen, and the paper size setter receives a preference setting selected from the custom size and the regular size being substantially the same. When an image formation command is received, the controller controls the image former based on the setting of the paper size and the preference setting to form an image on the paper of the selected size.

3 Claims, 11 Drawing Sheets

| | | | 181 |
|---|---|---|---|
| PAPER SIZE SETTING TABLE | | | |
| TRAY 1 | PAPER SIZE SETTING | A3 / A4 / ··· / CUSTOM SIZE | |
| TRAY 2 | PAPER SIZE SETTING | A3 / A4 / ··· / CUSTOM SIZE | |
| TRAY 3 | PAPER SIZE SETTING | A3 / A4 / ··· / CUSTOM SIZE | |
| TRAY 4 | PAPER SIZE SETTING | A3 / A4 / ··· / CUSTOM SIZE | |

CUSTOM SIZE SETTING TABLE

| | VERTICAL(mm) × HORIZONTAL(mm) | PREFERENCE SIZE SETTING | CUSTOM SIZE / REGULAR SIZE |
|---|---|---|---|
| 1 | VERTICAL(mm) × HORIZONTAL(mm) | PREFERENCE SIZE SETTING | CUSTOM SIZE / REGULAR SIZE |
| 2 | VERTICAL(mm) × HORIZONTAL(mm) | PREFERENCE SIZE SETTING | CUSTOM SIZE / REGULAR SIZE |
| 3 | VERTICAL(mm) × HORIZONTAL(mm) | PREFERENCE SIZE SETTING | CUSTOM SIZE / REGULAR SIZE |
| 4 | VERTICAL(mm) × HORIZONTAL(mm) | PREFERENCE SIZE SETTING | CUSTOM SIZE / REGULAR SIZE |

IMAGE FORMING APPARATUS

BACKGROUND OF THE INVENTION

Field of the Invention

The present invention relates to an image forming apparatus.

Description of the Background Art

As image forming apparatuses such as copying machines having a copying (copy) function, e.g., printers, and multi-function peripherals (MFPs) also including functions other than copying, ones that are provided with paper feed trays capable accommodating different sizes and types of paper are known.

In such an image forming apparatus, generally, a user makes the setting with respect to paper of a desired size and type on a paper setting screen of an operation panel, and starts printing of a document corresponding to the paper of the desired size and type from a personal computer (PC).

However, in an image forming apparatus having an automatic paper selection function, when printing is to be performed on paper of a custom size that is substantially the same as a regular size, in some cases, paper of the regular size instead of the custom size is automatically selected.

As a conventional invention related to the setting of such custom sized paper, disclosed is an invention of a copying apparatus which prevents erroneous operation by informing a user, by means of an alert, that copying cannot be executed in a case where an irregular mode is selected and wherein automatic paper selection is selected (see, for example, Japanese Unexamined Patent Application Publication No. 2001-13741).

Incidentally, in the case of an image forming apparatus which is shipped to and used in various countries around the world, the image forming apparatus accommodates to a regular sized envelope (a square 2 envelope, for example), which is not used at all in some countries.

If printing is to be performed on paper of a custom size that is close to the regular size as mentioned above, in some cases, a message is displayed indicating that a regular sized envelope that is not familiar in that country should be set.

The present invention has been conceived in consideration of the above circumstances, and the object of the present invention is to provide an image forming apparatus that is highly convenient for the user by reducing the complexity of paper setting as compared to that entailed conventionally, when custom sized paper is set in a paper feed tray.

SUMMARY OF THE INVENTION (1) The present invention provides an image forming apparatus which includes: a paper feed tray which allows paper for image formation to be stored therein, the paper for image formation being of a plurality of predetermined regular sizes and a custom size that is set in advance by a user; a paper size setter which receives a setting of a paper size; a display which displays a predetermined setting screen; a communicator which receives a command from the user and image data from an external device; an image former which forms an image on the paper based on the image data; and a controller which controls the paper size setter, the display, the communicator, and the image former, in which: when the paper size setter receives a setting of paper of the custom size, the controller determines whether the regular size that is substantially the same as the custom size is found; the display is made to display, when the regular size being substantially the same is found, a setting screen for making a setting of which of the custom size and the regular size being substantially the same is to be prioritized, and the paper size setter receives a preference setting selected by the user; and when the communicator receives an image formation command, the controller controls the image former based on the setting of the paper size and the preference setting, and causes an image to be formed on the paper of the selected size.

In the present invention, the "image forming apparatus" refers to an apparatus which forms and outputs an image, such as a copying machine having a copying (copy) function including a printer using an electrophotographic method for image formation with toner, and a multifunction peripheral (MFP) which also includes functions other than copying.

The "external device" refers to an external information processing apparatus, such as a personal computer (PC) and a portable terminal (e.g. a smartphone or a tablet), which is connected to the image forming apparatus of the present invention via a wired or wireless network.

The "plurality of predetermined regular sizes" refers to regular sizes such as A4 size and B5 size.

The "custom size" refers to an arbitrary size determined in advance by the user.

In the above, "the regular size that is substantially the same as the custom size" corresponds to a case where a difference in the size of paper in the vertical and horizontal dimensions is within a predetermined range (for example, within a range of 1 mm to several mms vertically and horizontally), and such a case is assumed as the substantially the same size.

The "display" of the present invention is realized by an operation panel 16, but instead of using the operation panel 16, communication with an external device such as a PC 2 may be performed so that the display is realized by a display 24 of the external device.

According to the present invention, when paper of the custom size is set in the paper feed tray, even if there is paper of a regular size that is substantially the same as the aforementioned custom size, an image is formed on the paper of a size selected on the basis of the preference setting selected by the user. Accordingly, it is possible to realize an image forming apparatus which is highly convenient for the user by reducing the complexity of paper setting as compared to that entailed conventionally.

Further, preferred embodiments of the present invention will be described.

(2) The image forming apparatus according to the present invention may be configured such that: the regular size includes a regular envelope size; the controller determines, when the communicator receives the image formation command, whether the regular envelope size that is substantially the same as the size of paper related to the image formation command is found; and when the regular envelope size being substantially the same is found, the display is made to display a selection screen for making a selection of which of the size of paper related to the image formation command and the regular envelope size being substantially the same is to be prioritized, and the image former is controlled to have an image formed on the paper of the selected size.

By such a configuration, when paper of the custom size is set in the paper feed tray, even if there is paper of a regular size that is confusingly similar to the aforementioned custom size, an image is formed on the paper of a size selected on the basis of the preference setting selected by the user. Accordingly, it is possible to realize an image forming apparatus which is highly convenient for the user by reducing the complexity of paper setting as compared to that entailed conventionally.

(3) The image forming apparatus according to the present invention may be configured such that when the communicator receives the image formation command, the controller controls the image former based on a document size specified by the image formation command, and the preference setting, and causes an image to be formed on the paper of the selected size.

By such a configuration, when an image of the image data received from the external device is to be formed, even if there is regular sized paper that is confusingly similar to a custom sized document, an image is formed on the paper of a size selected on the basis of the preference setting selected by the user. Accordingly, it is possible to realize an image forming apparatus which is highly convenient for the user by reducing the complexity of paper setting as compared to that entailed conventionally.

DESCRIPTION OF THE PREFERRED EMBODIMENTS

The present invention will now be described in further detail with reference to the accompanying drawings. Note that the following explanations are given merely for describing examples in all respects, and should not be construed as limiting the present invention.

Embodiment 1

Schematic Configuration of Digital Multifunction Peripheral 1

A digital multifunction peripheral 1 according to Embodiment 1 of the present invention will be described with reference to FIGS. 1 to 4.

Figure 1:
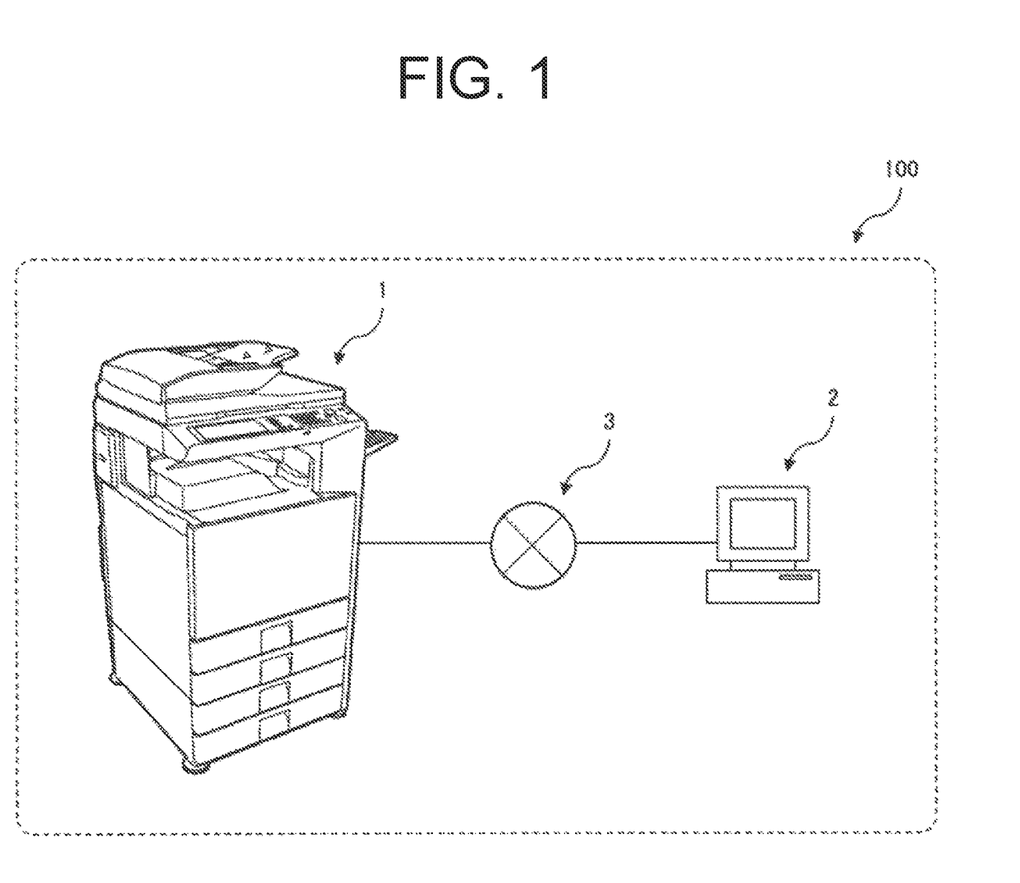
FIG. 1 is an explanatory diagram illustrating a configuration of an image forming system configured from a digital multifunction peripheral and a PC according to Embodiment 1 of the present invention.
Figure 2:
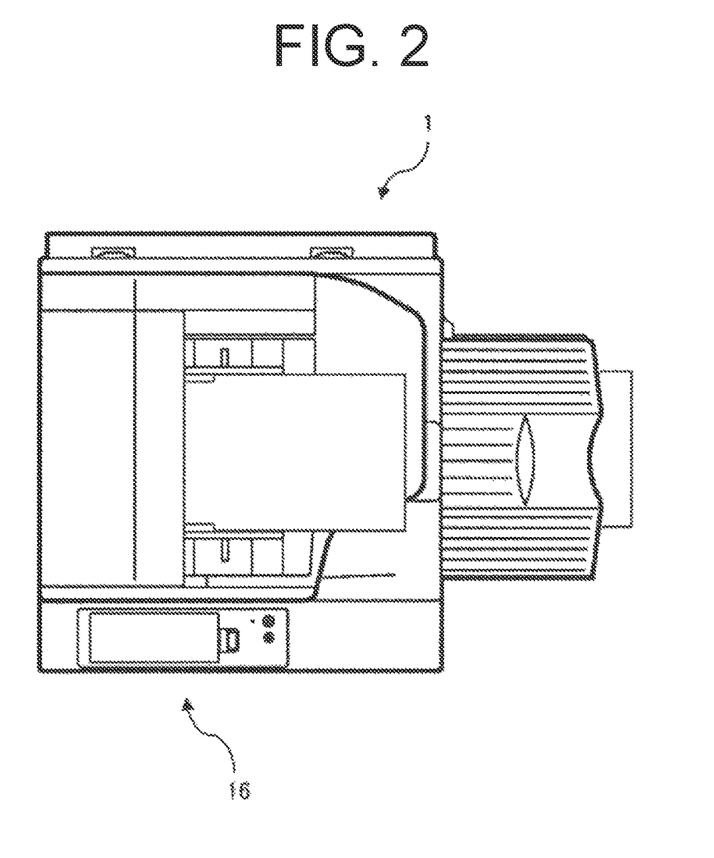
FIG. 2 is a plan view of the digital multifunction peripheral of FIG. 1.
Figure 3:
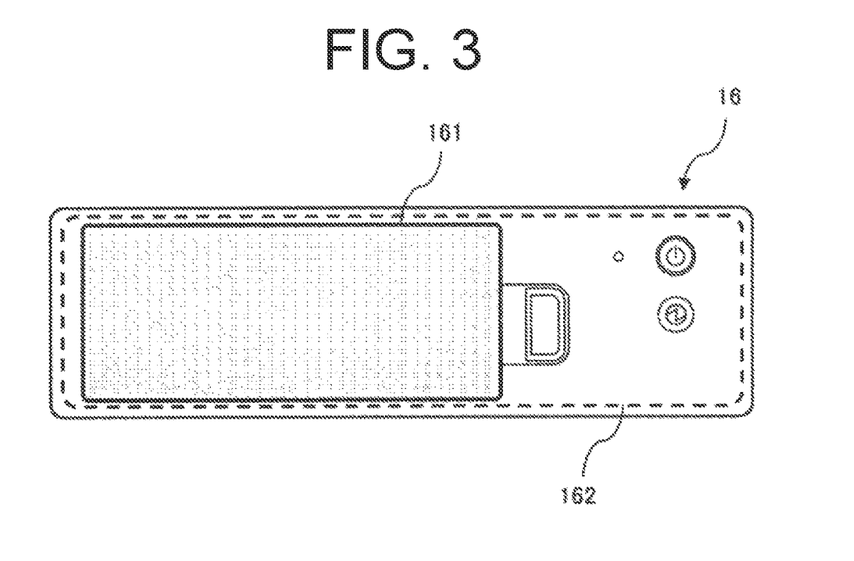
FIG. 3 is an explanatory diagram illustrating a panel unit of the digital multifunction peripheral of FIG. 1.

FIG. 1 is an explanatory diagram illustrating a configuration of an image forming system 100 configured from the digital multifunction peripheral 1, and the PC 2 according to Embodiment 1 of the present invention. Further, FIG. 2 is a plan view of the digital multifunction peripheral 1 of FIG. 1. Furthermore, FIG. 3 is an explanatory diagram illustrating the operation panel 16 of the digital multifunction peripheral 1 of FIG. 1.

As illustrated in FIG. 1, the image forming system 100 according to Embodiment 1 of the present invention is configured from the digital multifunction peripheral 1 and the PC 2 that are connected to each other via a network 3.

The digital multifunction peripheral 1 is a device such as a multifunction peripheral (MFP) which digitally processes image data acquired from an external device and the like, and has a printer function, a copying function, a scanner function, and a facsimile function.

The digital multifunction peripheral 1 executes jobs such as scanning, printing, copying or image transmission, on the basis of a command from a user and image data that have been received from an operator 162 or an external device such as the PC 2 via the network 3.

The PC 2 is a device which processes information.

The user outputs a command and image data, etc., related to image forming from the PC 2 to the digital multifunction peripheral 1 by way of the network 3 which is wired or wireless.

Although FIG. 1 illustrates only one PC 2, the image forming system 100 may include a plurality of PCs 2.

The network 3 may be either wired or wireless, and may use any network such as a local area network (LAN), a wide area network (WAN) such as the Internet, or a dedicated communication line.

Next, a schematic configuration of the digital multifunction peripheral 1 will be described with reference to FIG. 4.

Figure 4:
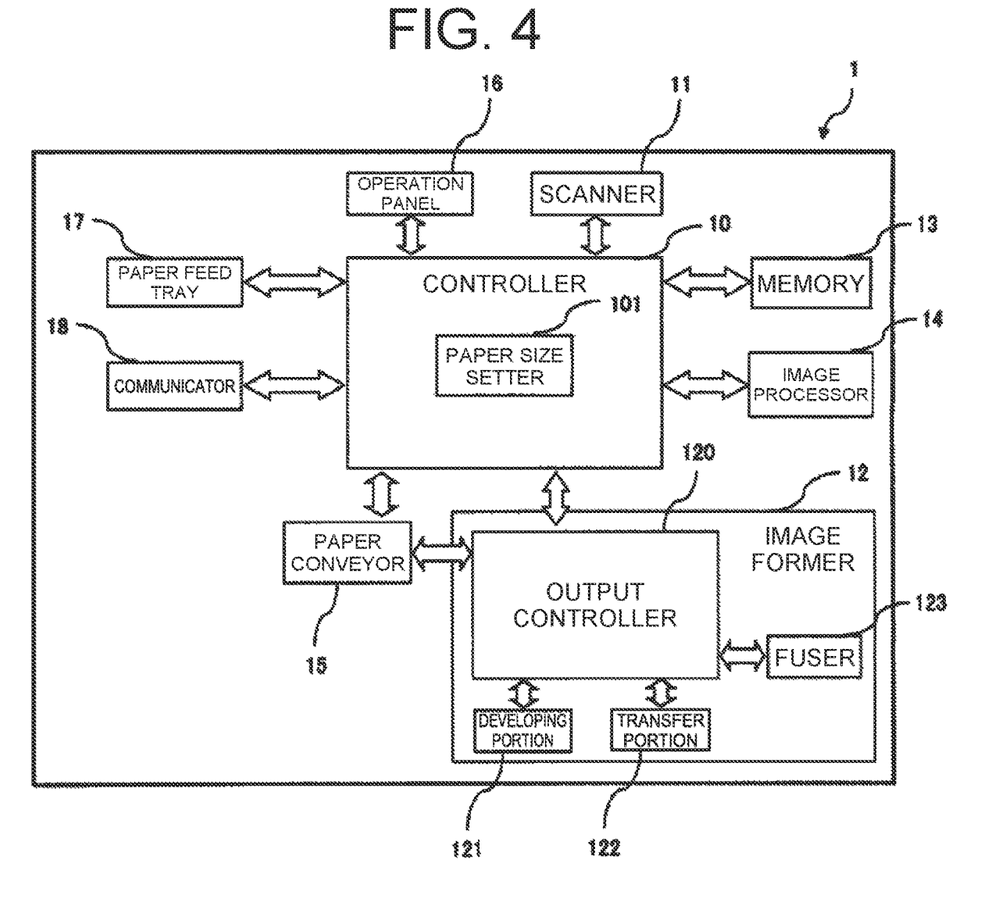
FIG. 4 is a block diagram illustrating a schematic configuration of the digital multifunction peripheral of FIG. 1.

FIG. 4 is a block diagram illustrating the schematic configuration of the digital multifunction peripheral 1 of FIG. 1.

As illustrated in FIG. 4, the digital multifunction peripheral 1 is provided with a controller 10, a scanner 11, an image former 12, a memory 13, an image processor 14, a paper conveyor 15, the operation panel 16, a paper feed tray 17, and a communicator 18.

Each of the constituent elements of the digital multifunction peripheral 1 will now be described.

The controller 10 controls the digital multifunction peripheral 1 in an integrated manner, and is configured from a CPU, a RAM, a ROM, various interface circuits, and the like.

In order to control the operation of the digital multifunction peripheral 1 as a whole, the controller 10 monitors and controls detection of each sensor, and all loads on a motor, a clutch, the operation panel 16, and the like.

A paper size setter 101 is a portion which receives the setting of a paper size of the paper feed tray 17.

Figure 7:
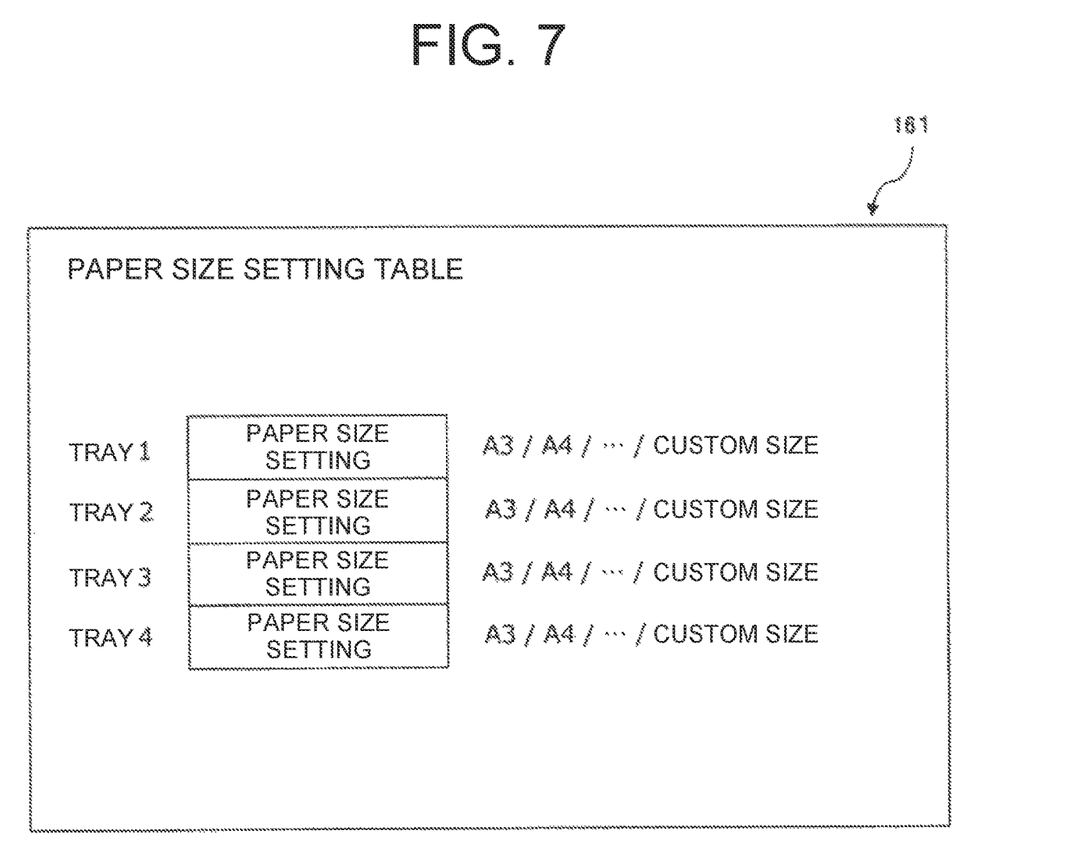
FIG. 7 is an explanatory diagram illustrating an example of a paper size setting table for a paper feed tray of the digital multifunction peripheral of FIG. 1.
Figure 8:
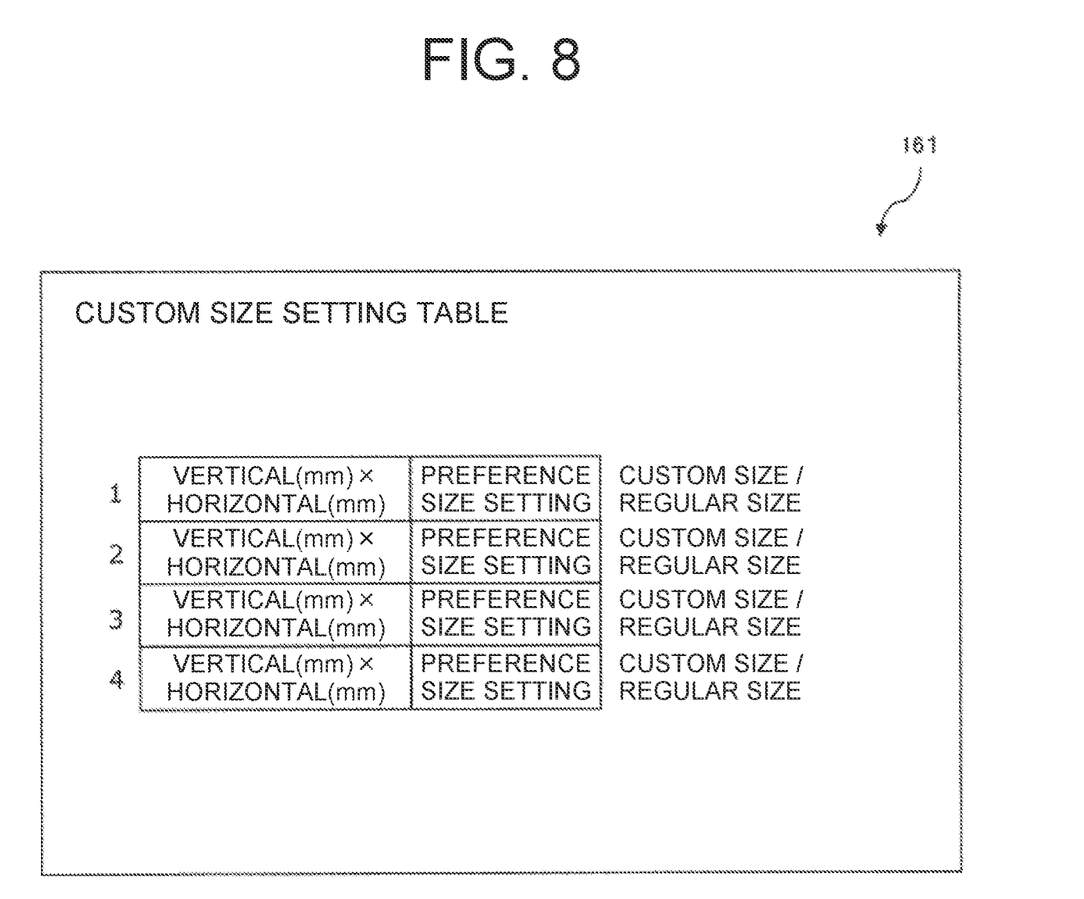
FIG. 8 is an explanatory diagram illustrating an example of a custom size setting table for the paper feed tray of the digital multifunction peripheral of FIG. 1.

The paper size setter 101 stores the setting of the paper size which has been received in a paper size setting table (FIG. 7) and a custom size setting table (FIG. 8).

Also, the paper size setter 101 receives a preference size setting (within the custom size setting table of FIG. 8) for making a setting of which of a custom size and a regular size is to be prioritized.

The scanner 11 a portion which detects and reads a document placed on a document table, and generates image data.

The image former 12 is a portion which forms and outputs, on the basis of the image data acquired by the scanner 11 or that received by the communicator 18 from the PC 2, an image on paper. The image former 12 is provided with an output controller 120, a developing portion 121, a transfer portion 122, and a fuser 123.

The output controller 120 is a portion which controls the developing portion 121, the transfer portion 122, and the fuser 123 to perform output control of copying and the like.

The developing portion 121 is a portion which supplies toner to an electrostatic latent image formed on a photoreceptor drum, which is charged to a predetermined potential by a charger, and makes the electrostatic latent image visible.

The transfer portion 122 is a portion which transfers a toner image, which has been formed on a surface of the photoreceptor drum, onto the paper conveyed by the paper conveyor 15.

The fuser 123 is a portion which performs fusing by applying pressure and heat to the paper on which an image has been transferred by the transfer portion 122.

The memory 13 is an element or a storage medium which stores information necessary for implementing various functions of the digital multifunction peripheral 1, and a control program, etc. For example, a storage medium such as a semiconductor device including a RAM, a ROM, and the like, a hard disk, a flash storage, or an SSD, is used.

Note that a program and data may be held in different devices, such as that an area for holding the data is configured by a hard disk drive, and an area for holding the program is configured by a flash storage.

The image processor 14 is a portion which converts a document image that has been read by the scanner 11 into appropriate electrical signals to generate image data, and performs processing to make the image data input from the scanner 11 suitable for output, such as enlargement and reduction, in accordance with a command from a display 161.

The paper conveyor 15 is a portion which conveys sheets of paper stored in a paper feed cassette and a manual feed tray to the image former 12 via a predetermined conveyance path. Also, the paper conveyor 15 is a portion which discharges the paper on which an image has been formed by the image former 12 to a paper discharge tray via a predetermined conveyance path.

The operation panel 16 is a unit provided with a liquid crystal display, and includes the display 161 and the operator 162.

The display 161 is a portion which displays various kinds of information. The display 161 is constituted of, for example, a CRT display, a liquid crystal display, or an EL display, and is a display device such as a monitor or a line display for an operating system or application software to display electronic data, for example, the processing state. The controller 10 displays the operation and the state of the digital multifunction peripheral 1 through the display 161.

The operator 162 is a portion which is provided with a touch panel, and receives a command from the user.

The paper feed tray 17 is a tray for storing paper for image formation, which is, for example, a paper feed cassette or a manual feed tray.

The communicator 18 is a portion which communicates with an external device such as an information processing apparatus including, for example, a personal computer (PC) and a portable terminal (e.g. a smartphone or a tablet) or a facsimile machine via the network 3, and transmits and receives various kinds of information such as an e-mail and facsimile to and from such external communication devices.

Also, the communicator 18 receives a command and image data related to image formation from the external devices.

Schematic Configuration of PC 2

Next, a schematic configuration of the PC 2 will be described with reference to FIG. 5.

Figure 5:
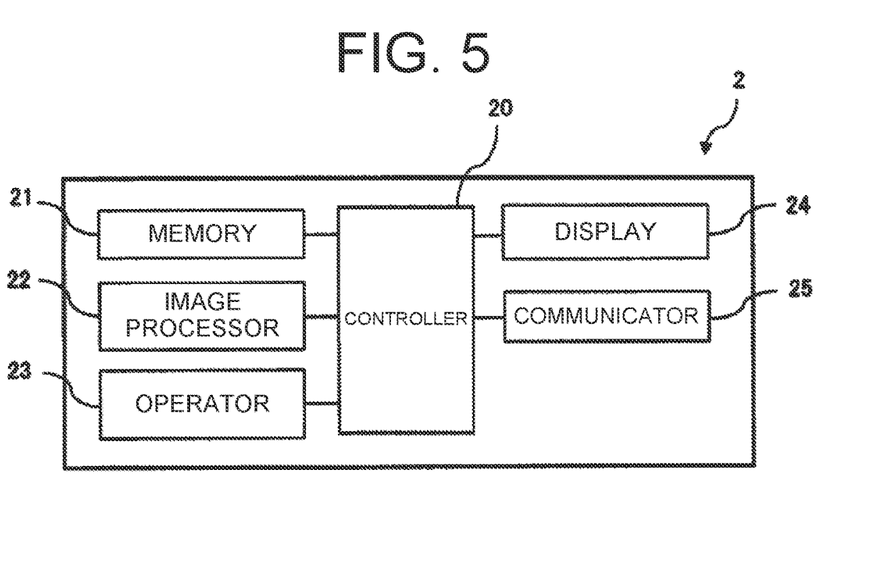
FIG. 5 is a block diagram illustrating a schematic configuration of the PC illustrated in FIG. 1.

FIG. 5 is a block diagram illustrating the schematic configuration of the PC 2 illustrated in FIG. 1.

As illustrated in FIG. 5, the PC 2 of the present invention is provided with a controller 20, a memory 21, an image processor 22, an operator 23, the display 24, and a communicator 25.

Since the structures of the controller 20, the memory 21, the image processor 22, the display 24, and the communicator 25 are similar to those of the controller 10, the memory 13, the image processor 14, the display 161, and the communicator 18 of the digital multifunction peripheral 1 of FIG. 4, respectively, explanation of these elements is omitted.

The operator 23 is an interface for operating the PC 2.

The operator 23 may be one which is comprised of an arrangement of a plurality of keys, and includes a touch panel function.

As the user operates the operator 23, and executes a command with respect to the PC 2, an image formation command and an image data transmission command with respect to the digital multifunction peripheral 1 can be transmitted.

Example of Paper Selection Processing of Digital Multifunction Peripheral 1 according to Embodiment 1 of Present Invention Next, an example of paper selection processing of the digital multifunction peripheral 1 according to Embodiment 1 of the present invention will be described with reference to FIGS. 6 to 10.

Figure 6:
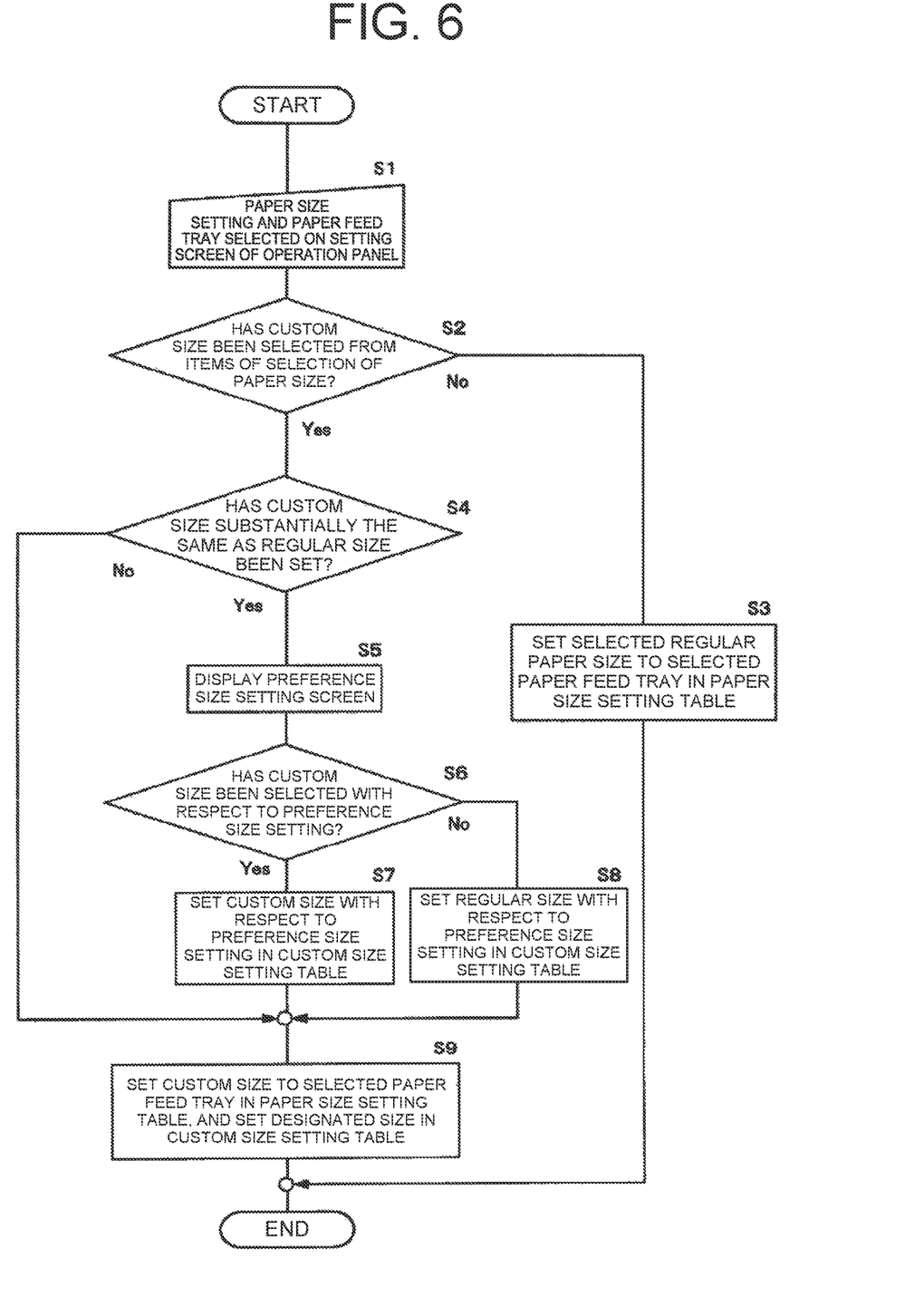
FIG. 6 is a flowchart indicating an outline of paper selection processing to be performed at the time of paper setting by the digital multifunction peripheral of FIG. 1.

FIG. 6 is an explanatory diagram illustrating an example of processing in performing the setting of the paper feed tray 17 of the digital multifunction peripheral 1 of FIG. 1.

In step S1 of FIG. 6, when a paper size setting and the paper feed tray 17 are selected on a setting screen of the operation panel 16 (step S1), a determination of step S2 is made (step S2).

Next, in step S2, it is determined whether or not a custom size is selected from items of selection of the paper size (step S2).

FIG. 7 is an explanatory diagram illustrating an example of the paper size setting table for the paper feed tray 17 of the digital multifunction peripheral 1 of FIG. 1.

In the paper size setting table of FIG. 7, the paper size setting for the paper feed tray 17 which has been made by the user is stored.

As illustrated in FIG. 7, in the paper size setting table, sizes such as A3 size, A4 size, and custom size are set for each of the trays, i.e., Tray 1 to Tray 4, respectively.

In step S2 of FIG. 6, if the custom size is not selected from the items of selection of the paper size (i.e., if the determination of step S2 is No), in step S3, the controller 10 sets a selected regular paper size (A3 size, for example) to the selected paper feed tray in the paper size setting table (step S3).

Meanwhile, if the custom size is selected from the items of selection of the paper size (i.e., if the determination of step S2 is Yes), in step S4, the controller 10 determines whether or not a custom size that is substantially the same as the regular size has been set (step S4).

Here, as the substantially the same custom size mentioned above, ones whose vertical and horizontal dimensions are within a predetermined range from the regular sizes, such as those within a range of 1 mm to several mms from the regular sizes in the vertical and horizontal dimensions are assumed.

If the custom size that is substantially the same as the regular size is not set (i.e., if the determination of step S4 is No), in step S9, the controller 10 sets a custom size (1 to 4) to the selected paper feed tray in the paper size setting table, and sets a designated size with respect to a custom size setting of the corresponding number in the custom size setting table (step S9).

FIG. 8 is an explanatory diagram illustrating an example of the custom size setting table for the paper feed tray 17 of the digital multifunction peripheral 1 of FIG. 1.

In the custom size setting table of FIG. 8, a custom size of the paper for the paper feed tray 17 set by the user is defined as vertical (mm)×horizontal (mm).

Meanwhile, in step S4 of FIG. 6, if the custom size that is substantially the same as the regular size is set (i.e., if the determination of step S4 is Yes), in step S5, the controller 10 displays a preference size setting screen (step S5).

Figure 9:
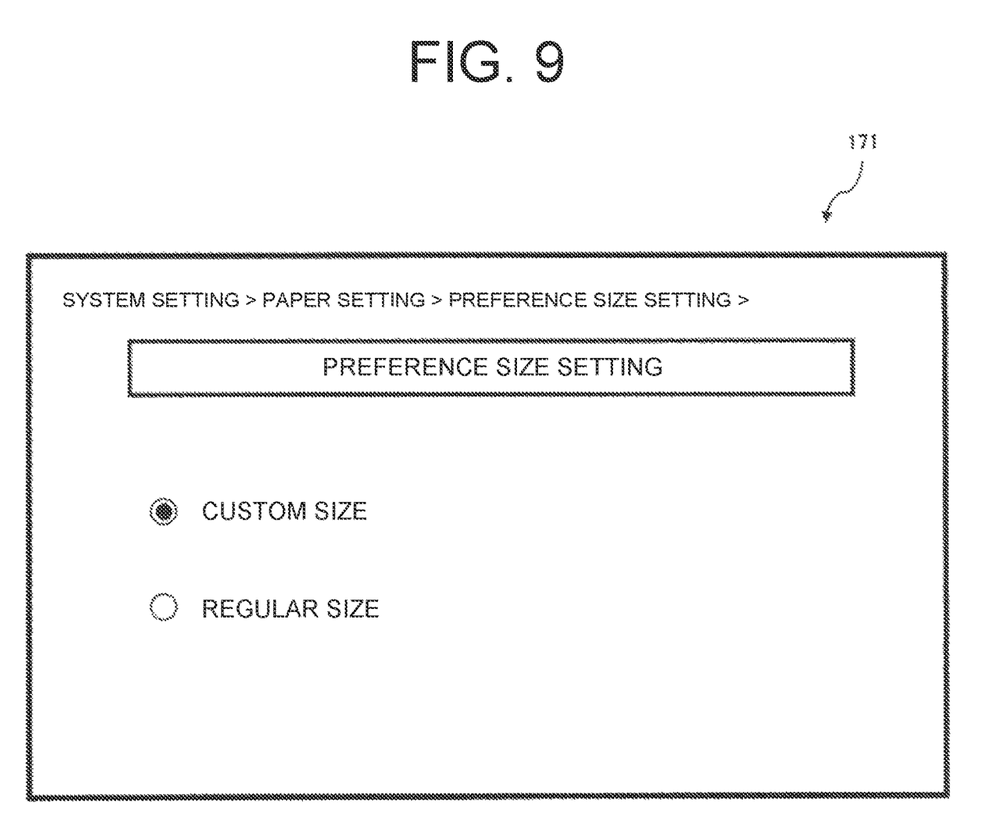
FIG. 9 is an explanatory diagram illustrating an example of a preference size setting screen for setting a degree of relative priority of the paper size in paper selection processing at the time of printing of the digital multifunction peripheral of FIG. 1.

FIG. 9 is an explanatory diagram illustrating an example of the preference size setting screen for setting a degree of relative priority of the paper size in the paper selection processing at the time of printing of the digital multifunction peripheral 1 of FIG. 1.

The user sets, on the preference size setting screen as shown in FIG. 9, a degree of relative priority of the paper size in the paper selection processing at the time of printing.

In the example of FIG. 9, two items, i.e., the custom size and the regular size, are provided as a choice of the preference size, and the custom size is selected.

Next, in step S6 of FIG. 6, the controller 10 determines whether or not the custom size is selected with respect to the preference size setting (step S6).

If the custom size is selected with respect to the preference size setting (i.e., if the determination of step S6 is Yes), the controller 10 sets, in step S7, the custom size with respect to a preference setting of the custom size setting table (step S7).

After that, the controller 10 performs the processing of step S9 (step S9).

Meanwhile, if the regular size is selected with respect to the preference size setting (i.e., if the determination of step S6 is No), the controller 10 sets, in step S8, the regular size with respect to the preference setting of the custom size setting table (step S8).

After that, the controller 10 performs the processing of step S9 (step S9).

In the custom size setting table of FIG. 8, the preference size setting for making a setting of which of the custom size and the regular size is to be prioritized is stored.

Next, a flow of the paper selection processing to be performed at the time of printing by the digital multifunction peripheral 1 of FIG. 1 will be described with reference to FIG. 10.

Figure 10:
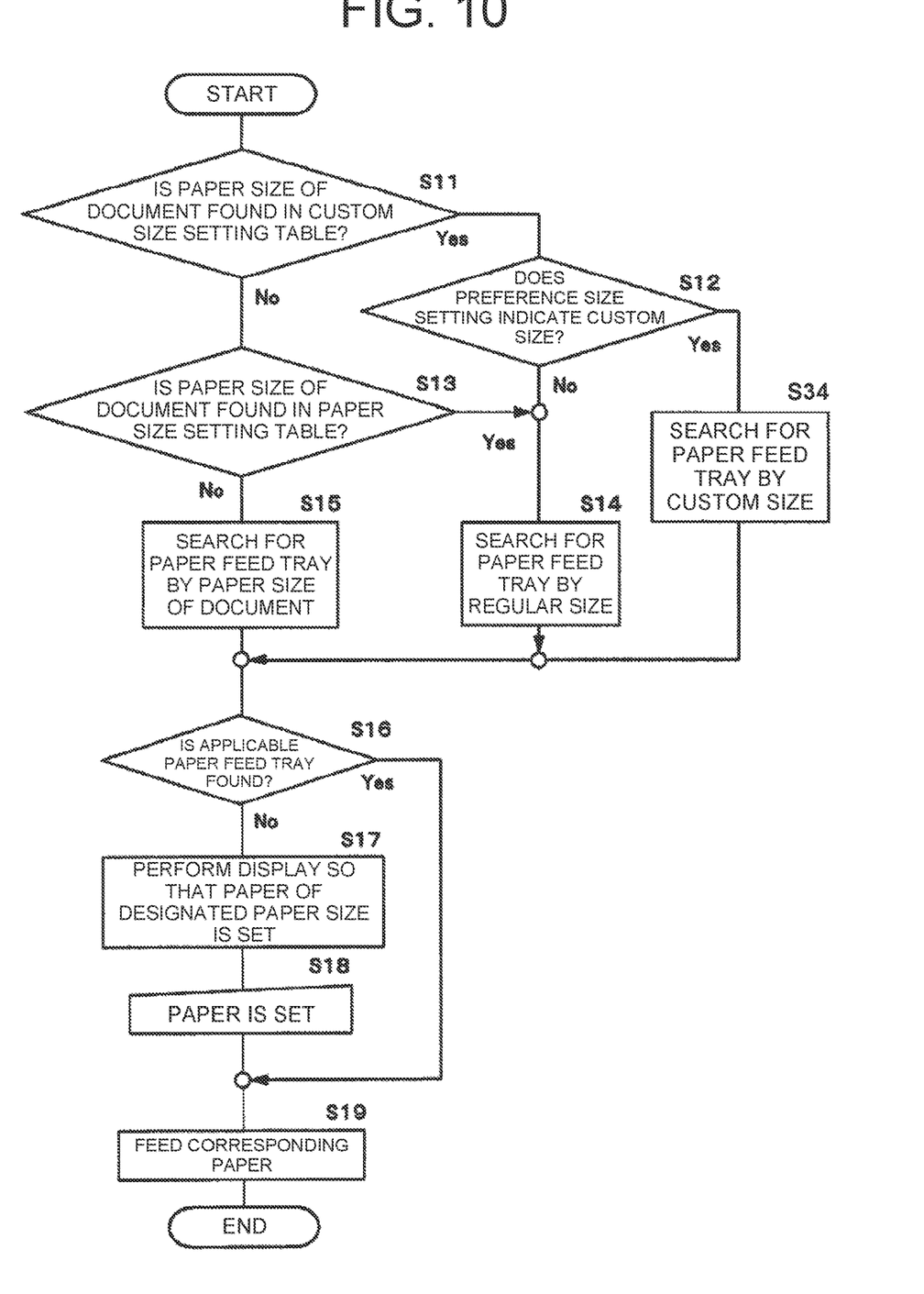
FIG. 10 is a flowchart indicating an outline of paper selection processing to be performed at the time of printing by the digital multifunction peripheral of FIG. 1.
Figure 11:
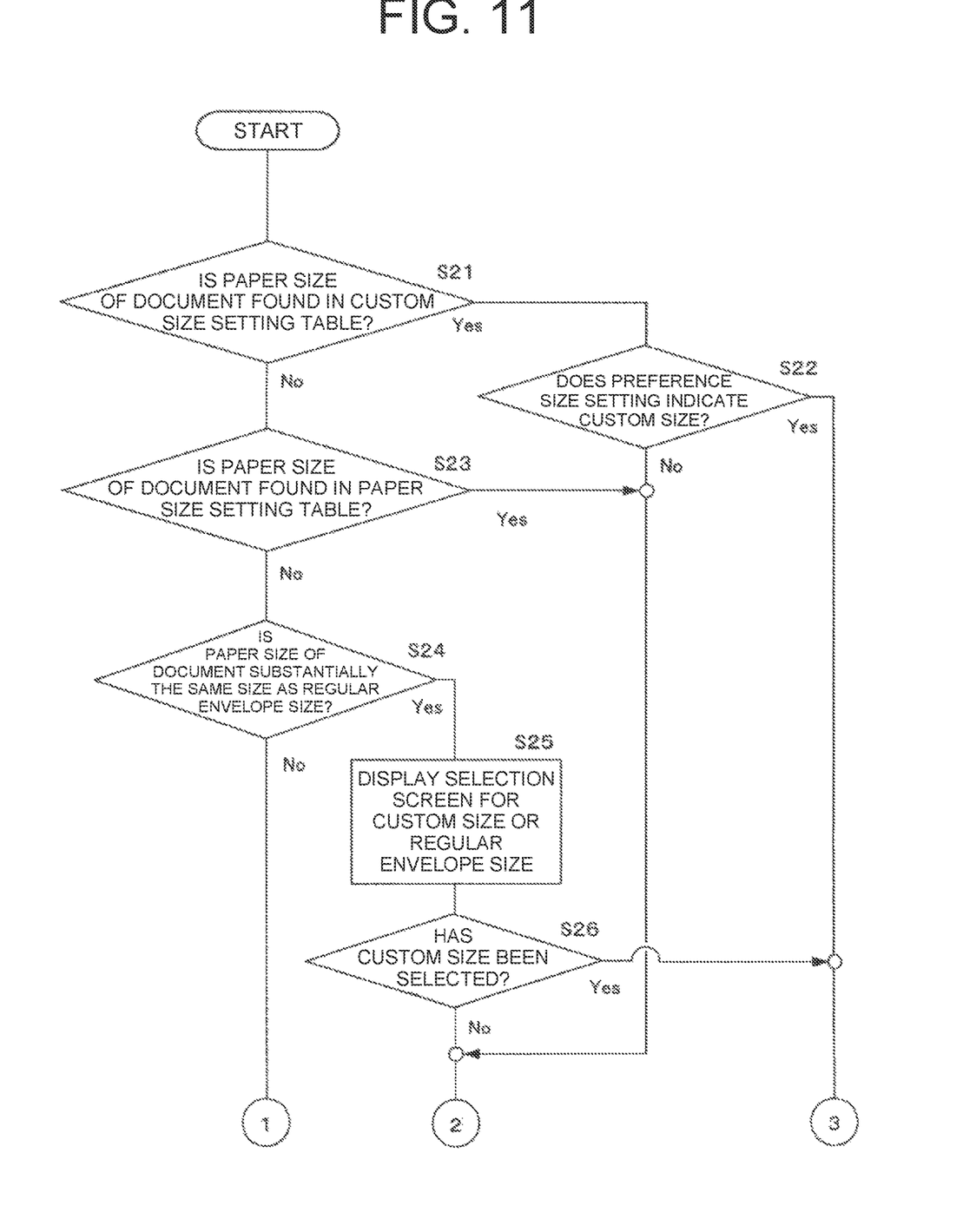
FIG. 11 is a flowchart indicating an outline of paper selection processing to be performed at the time of printing by a digital multifunction peripheral according to Embodiment 2 of the present invention.

FIGS. 10 and 11 are flowcharts indicating an outline of the paper selection processing to be performed at the time of printing by the digital multifunction peripheral 1 of FIG. 1.

When print data is received by the communicator 18, the controller 10 performs the paper selection processing, as indicated in FIG. 10.

In step S11 of FIG. 10, the controller 10 determines whether or not a paper size of a document of the received print data is found in the custom size setting table (step S11).

If the paper size of the document of the received print data is found in the custom size setting table (i.e., if the determination of step S11 is Yes), in step S12, the controller 10 determines whether or not the preference size setting indicates a custom size (step S12).

If the preference size setting indicates a custom size (i.e., if the determination of step S12 is Yes), the controller 10 searches for the paper feed tray 17 by the custom size (step S34).

After that, the controller 10 makes a determination of step S16 (step S16).

Meanwhile, in the determination of step S12, if the preference size setting does not indicate a custom size (i.e., if the determination of step S12 is No), in step S14, the controller 10 searches for the paper feed tray 17 by a regular size (step S14).

After that, the controller 10 makes the determination of step S16 (step S16).

Further, in step S11, if the paper size of the document of the received print data is not found in the custom size setting table (i.e., if the determination of step S11 is No), in step S13, the controller 10 determines whether or not the paper size of the document is found in the paper size setting table (step S13).

If the paper size of the document is found in the paper size setting table (i.e., if the determination of step S13 is Yes), in step S14, the controller 10 searches for the paper feed tray 17 by the regular size (step S14).

Meanwhile, if the paper size of the document is not found in the paper size setting table (i.e., if the determination of step S13 is No), in step S15, the controller 10 searches for the paper feed tray 17 by the paper size of the document (step S15).

Next, in step S16, the controller 10 determines whether or not an applicable paper feed tray 17 is found (step S16).

If an applicable paper feed tray 17 is found (i.e., if the determination of step S16 is Yes), the controller 10 feeds, in step S19, the corresponding paper (step S19).

Meanwhile, if an applicable paper feed tray 17 is not found (i.e., if the determination of step S16 is No), in step S17, the controller 10 causes the display 161 to perform display so that paper of a designated paper size is set (step S17).

Next, when the paper is set in step S18 (step S18), the controller 10 feeds, in step S19, the corresponding paper (step S19).

As can be seen, when paper of a custom size is set in the paper feed tray 17, even if there is paper of a regular size that is confusingly similar to the aforementioned custom size, an image is formed on the paper of a size selected on the basis of the preference setting selected by the user. Accordingly, it is possible to realize the digital multifunction peripheral 1 which is highly convenient for the user by reducing the complexity of paper setting as compared to that entailed conventionally.

Embodiment 2

Next, a digital multifunction peripheral 1 according to Embodiment 2 of the present invention will be described with reference to FIGS. 11 and 12.

FIG. 11 is a flowchart indicating an outline of paper selection processing to be performed at the time of printing by the digital multifunction peripheral 1 according to Embodiment 2 of the present invention.

A schematic configuration of the digital multifunction peripheral 1 according to Embodiment 2 is the same as that of Embodiment 1 (FIG. 4), and thus will not be described.

Figure 12:
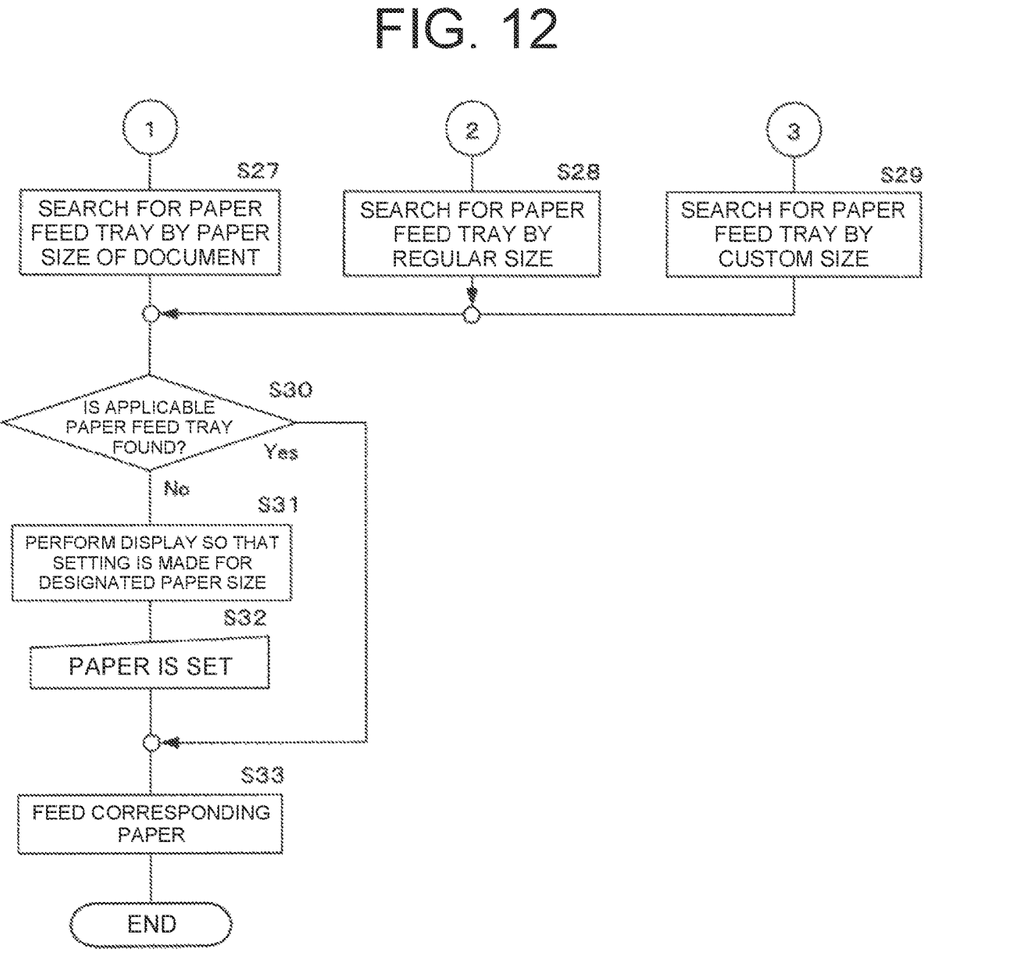
FIG. 12 is a flowchart indicating an outline of paper selection processing to be performed at the time of printing by the digital multifunction peripheral according to Embodiment 2 of the present invention.

When print data is received by a communicator 18, a controller 10 performs the paper selection processing, as indicated in FIGS. 11 and 12.

In step S21 of FIG. 11, the controller 10 determines whether or not a paper size of a document of the received print data is found in a custom size setting table (step S21).

If the paper size of the document of the received print data is found in the custom size setting table (i.e., if the determination of step S21 is Yes), the controller 10 determines, in step S22, whether or not a preference size setting indicates a custom size (step S22).

If the preference size setting indicates a custom size (i.e., if the determination of step S22 is Yes), in step S29 of FIG. 12, the controller 10 searches for a paper feed tray 17 by the custom size (step S29 of FIG. 12).

After that, the controller 10 makes a determination of step S30 (step S30).

Meanwhile, in the determination of step S22 of FIG. 11, if the preference size setting does not indicate a custom size (i.e., if the determination of step S22 is No), in step S28 of FIG. 12, the controller 10 searches for the paper feed tray 17 by a regular size (step S28 of FIG. 12).

After that, the controller 10 makes the determination of step S30 (step S30).

Further, in step S21 of FIG. 11, if the paper size of the document for which a print command is received is not found in the custom size setting table (i.e., if the determination of step S21 is No), in step S23, the controller 10 determines whether or not the paper size of the document is found in a paper size setting table (step S23).

If the paper size of the document is found in the paper size setting table (i.e., if the determination of step S23 is Yes), in step S28 of FIG. 12, the controller 10 searches for the paper feed tray 17 by the regular size (step S28 of FIG. 12).

Meanwhile, if the paper size of the document is not found in the paper size setting table (i.e., if the determination of step S23 is No), in step S24, the controller 10 determines whether or not the paper size of the document is substantially the same size as a regular envelope size (step S24).

If the paper size of the document is substantially the same size as the regular envelope size (i.e., if the determination of step S24 is Yes), in step S25, the controller 10 causes a display 161 to display a selection screen for selecting either a custom size or a regular size (step S25).

Next, in the following step S26, the controller 10 makes a determination of whether or not the custom size is selected (step S26).

If the custom size is selected (i.e., if the determination of step S26 is Yes), in step S29 of FIG. 12, the controller 10 searches for the paper feed tray 17 by the custom size (step S29 of FIG. 12).

Meanwhile, if the regular size is selected (i.e., if the determination of step S26 is No), in step S28 of FIG. 12, the controller 10 searches for the paper feed tray 17 by the regular size (step S28 of FIG. 12).

Further, in step S24, if the paper size of the document is not substantially the same size as the regular envelope size (i.e., if the determination of step S24 is No), in step S27 of FIG. 12, the controller 10 searches for the paper feed tray 17 by the paper size of the document (step S27 of FIG. 12).

Next, in step S30, the controller 10 determines whether or not an applicable paper feed tray 17 is found (step S30).

If an applicable paper feed tray 17 is found (i.e., if the determination of step S30 is Yes), the controller 10 feeds, in step S33, the corresponding paper (step S33).

Meanwhile, if an applicable paper feed tray 17 is not found (i.e., if the determination of step S30 is No), in step S31, the controller 10 causes the display 161 to perform display so that setting is made for a designated paper size (step S31).

Next, when the paper is set in step S32 (step S32), the controller 10 feeds, in step S33, the corresponding paper (step S33).

As can be seen, even if there is paper of a regular envelope size that is confusingly similar to the aforementioned custom size, an image is formed on the paper of a size selected by the user via display of the selection screen. Accordingly, it is possible to realize the digital multifunction peripheral 1 which is highly convenient for the user by reducing the complexity of paper setting as compared to that entailed conventionally.

Embodiment 3

Next, a digital multifunction peripheral 1 according to Embodiment 3 of the present invention will be described with reference to FIG. 13.

Figure 13:
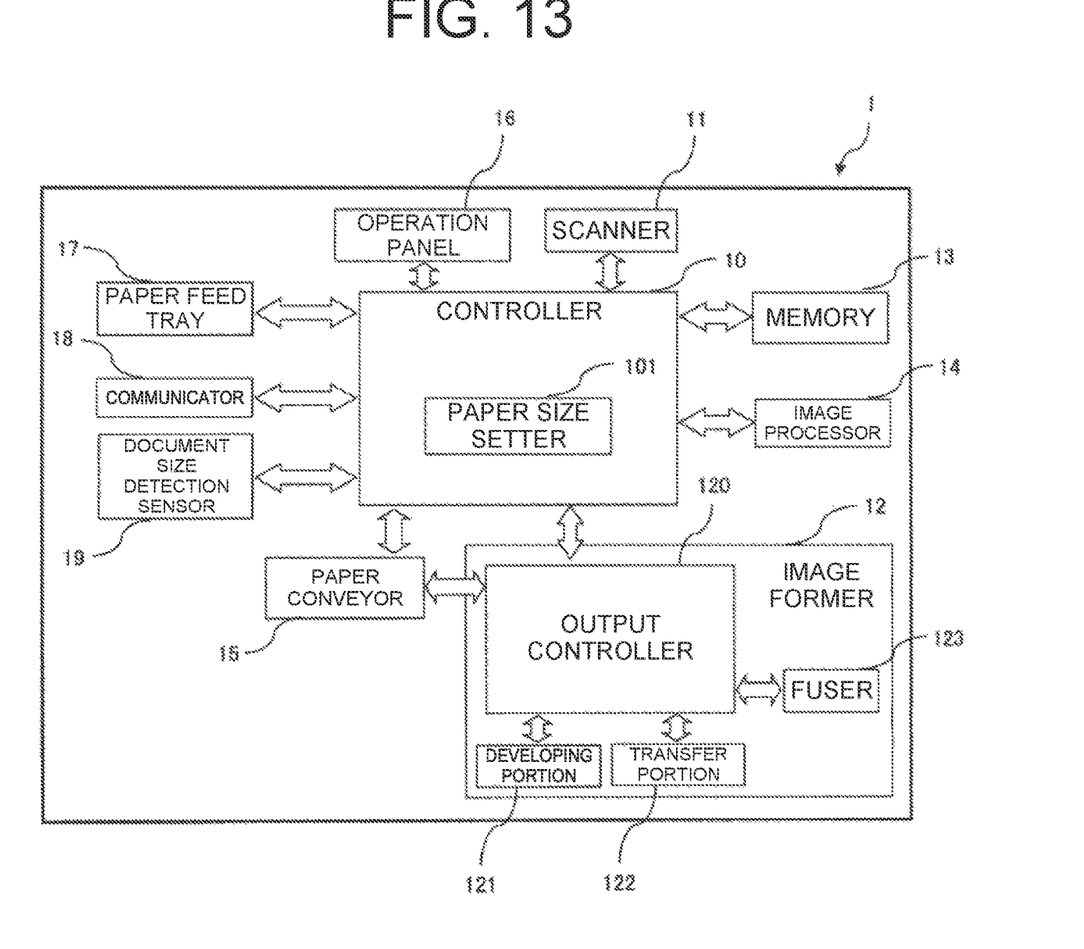
FIG. 13 is a block diagram illustrating a schematic configuration of a digital multifunction peripheral according to Embodiment 3 of the present invention.

FIG. 13 is a block diagram illustrating a schematic configuration of the digital multifunction peripheral 1 according to Embodiment 3 of the present invention.

A difference from Embodiment 1 (FIG. 4) is that the digital multifunction peripheral 1 of FIG. 13 is provided with a document size detection sensor 19.

In Embodiment 1, it is determined whether or not the paper size of the document of the received print data is found in one of the custom size setting table and the paper size setting table.

Meanwhile, the document size detection sensor 19 is provided in Embodiment 3, whereby the size of a document placed on a document table is detected, and it is determined whether or not a paper size is found in one of the custom size setting table and the paper size setting table.

Further, not only the size of a document placed on the document table, but also the size of a document placed on a manual feed tray may be detected.

As can be seen, in a case where a document placed on a document table or the like is to be copied, even if there is regular sized paper that is confusingly similar to a custom sized document, an image is formed on the paper of a size selected on the basis of a preference setting selected by the user. Accordingly, it is possible to realize the digital multifunction peripheral 1 which is highly convenient for the user by reducing the complexity of paper setting as compared to that entailed conventionally.

A preferred embodiment of the present invention also includes a combination of the above-described embodiments.

Various modifications of the present invention may be implemented besides the embodiments described above. Such modifications should not be construed as falling outside the scope of the present invention. The present invention is embodied by the claims and their equivalents, and should embrace all of the modifications within the scope of the above.

What is claimed is:

1. An image forming apparatus comprising:
    a paper feed tray which allows paper for image formation to be stored therein, the paper for image formation being of a plurality of predetermined regular sizes and a custom size that is set in advance by a user;
    a paper size setter which receives a setting of a paper size;
    a display which displays a predetermined setting screen;
    a communicator which receives a command from the user and image data from an external device;
    an image former which forms an image on the paper based on the image data; and
    a controller which controls the paper size setter, the display, the communicator, and the image former, wherein:
    when the paper size setter receives a setting of paper of the custom size, the controller determines whether the regular size that is substantially the same as the custom size is found;
    the display is made to display, when the regular size being substantially the same is found, a setting screen for making a setting of which of the custom size and the regular size being substantially the same is to be prioritized, and the paper size setter receives a preference setting selected by the user, and when the communicator receives an image formation command, the controller controls the image former based on the setting of the paper size and the preference setting, and causes an image to be formed on the paper of the selected size; and
    the paper size setter receives a setting of paper of the custom size to the selected paper feed tray when the regular size being substantially the same is not found, and when the communicator receives an image formation command, the controller controls the image former based on the setting of the custom size and causes an image to be formed on the paper of the selected paper feed tray.

2. The image forming apparatus according to claim 1, wherein:
    the regular size includes a regular envelope size;
    the controller determines, when the communicator receives the image formation command, whether the regular envelope size that is substantially the same as the size of paper related to the image formation command is found; and
    when the regular envelope size being substantially the same is found, the display is made to display a selection screen for making a selection of which of the size of paper related to the image formation command and the regular envelope size being substantially the same is to be prioritized, and the image former is controlled to have an image formed on the paper of the selected size.

3. The image forming apparatus according to claim 1, wherein when the communicator receives the image formation command, the controller controls the image former based on a document size specified by the image formation command, and the preference setting, and causes an image to be formed on the paper of the selected size.

* * * * *